United States Patent [19]

Greenwood

[11] Patent Number: 4,665,632
[45] Date of Patent: May 19, 1987

[54] APPARATUS FOR UNIFORMLY DISTRIBUTING FLUID THROUGH A BED OF PARTICULATE MATERIAL

[75] Inventor: Arthur R. Greenwood, Niles, Ill.

[73] Assignee: UOP Inc., Des Plaines, Ill.

[21] Appl. No.: 780,788

[22] Filed: Sep. 27, 1985

[51] Int. Cl.[4] .............................................. F26B 17/14
[52] U.S. Cl. ....................................... 34/168; 34/174; 422/191; 422/216
[58] Field of Search ........................ 34/57 A, 168, 174; 422/142, 144, 145, 223, 191, 192, 193, 213, 216, 218

[56] References Cited

U.S. PATENT DOCUMENTS

| 2,703,936 | 3/1955 | Hut | 34/168 |
| 3,652,231 | 3/1972 | Greenwood et al. | 422/223 |
| 4,567,022 | 1/1986 | Greenwood | 422/144 |
| 4,567,940 | 2/1986 | Klaren | 34/57 A |

Primary Examiner—Larry I. Schwartz
Attorney, Agent, or Firm—Thomas K. McBride; John F. Spears, Jr.; Richard J. Cordovano

[57] ABSTRACT

Apparatus for uniformly distributing a fluid such as a vapor or gas upwardly through a cylindrical bed of a particulate contact material such as a catalyst, without interfering with the catalyst flow, includes an annular chamber which is closed at its top and which surrounds the cylindrical bed. The annular chamber receives fluid near its top and distributes it evenly at its bottom where it passes the fluid downwardly into a region which contains catalyst particles which have descended from the cylindrical bed, said region being defined at its top by the catalyst at the bottom of the aforesaid cylindrical bed and the open bottom end of the annular chamber, at its bottom by the bottom of a vessel containing the apparatus, and at its sides by the sides of the vessel. The distance between the bottom of the cylindrical bed and the bottom of the vessel is preferably at least equal to the radius of the cylindrical bed.

5 Claims, 4 Drawing Figures

U.S. Patent    May 19, 1987    4,665,632

APPARATUS FOR UNIFORMLY DISTRIBUTING FLUID THROUGH A BED OF PARTICULATE MATERIAL

BACKGROUND OF THE INVENTION

The invention relates to apparatus of the type wherein a fluid such as a gas or vapor is used to react with or treat a particulate type of contact material such as a catalyst, which is passing by gravity from one reaction or treating zone to another. Examples of processes carried out in such an apparatus include various hydroprocessing techniques such as catalytic reforming, catalyst regeneration, hydrotreating, dehydrogenation of butane and dehydrocyclodimerization, to name a few. A specific example of a catalyst regeneration apparatus in which a catalyst whose surface has been covered with coke during a catalytic reforming operation, moves downward through a carbon burnoff section, through a halogenation section and into a drying section is shown and described in Greenwood et al., U.S. Pat. No. 3,652,231, the subject matter of which is herein incorporated by reference. In the embodiment of FIG. 3 of the referenced patent, the catalyst moves downwardly in the annular space between a pair of spaced concentric perforated screens and is subjected initially to a first radially flowing recycle flue gas having a relatively low oxygen content and secondly, to a radially flowing second gas containing air, a halogen and steam. The catalyst continues to move from the aforesaid annular space as a descending bed into a generally cylindrical drying section wherein it is contacted by a hot and dry air stream, or other suitable drying medium before it exits the bottom of the apparatus. The drying medium is typically distributed by an arrangement of perforated distributor members including a central trunk with a plurality of laterally extending branches positioned generally uniformly in a horizontal plane near the bottom of the drying section. In order to minimize plugging of the distributor members by the catalyst particles, the distributor members usually have their flow openings located only in their downwardly facing portions. However, even when the distributor members are intricately fabricated so as to include spaced apart wedge wire screen portions which form slots in their bottom surfaces and internal baffles to help distribute the flow uniformly through all of the slots, it appears that plugging of the distributors is still possible. Also, since plugging of a few slots produces higher velocities at the other slots, the plugging becomes progressively greater since the higher velocities can produce unwanted fluidization and consequent catalyst attrition which can cause additional plugging. The placing of a large number of branch pipes or laterals on a distributor pipe can permit lower flow velocities, and thus less chance of damaging fluidization, than where fewer branches are present. However, the mere presence of any pipes in the catalyst bed produces an obstruction in the downward flow path of the catalyst bed which can accelerate attrition and, of course, a greater number of pipes would increase the problem. In addition to the attrition caused to the catalyst when gas velocities become too large due to screen plugging, the use of perforated distributor members is also very costly, especially when such members must be fabricated from sections of slotted screens.

SUMMARY

It is among the objects of the present invention to provide an apparatus for distributing fluid upwardly through a generally cylindrical bed of particulate material that results in more uniform flow distribution than existing devices, that is simple and relatively inexpensive to produce, and which is incapable of being plugged.

It is another object of the invention to provide a fluid distribution apparatus that will not interfere with the downward plug flow of a bed of particulate material inside a generally cylindrical vessel.

Yet another object is to provide an apparatus for distributing fluid upwardly through a generally cylindrical bed of contact material which can be adapted for use in existing vessels which were initially designed for conventional perforated pipe distributors.

The foregoing and other objects and advantages are attained by the distribution apparatus of the present invention in which a flow of fluid, generally a vapor, is brought into an upper part of an annular chamber which surrounds a generally cylindrical member containing a bed of particulate material to be contacted by the fluid. The bed is preferably moving downwardly but could also be fixed. The annular chamber is sealed at its top but open at its bottom. In a preferred embodiment for achieving extremely uniform flow through the bed of particulate material, the wall portion of the vessel which defines the outer wall of the aforesaid annular chamber extends downwardly from the annular chamber until it meets a bottom wall of the vessel. The catalyst in the vessel has a vertical cross-section defined by the bottom wall of the vessel, the downward extension of the outer wall of the annular chamber and the inner wall of a tubular member whose outer wall defines the inner wall of the annular chamber. The diameter of the vertical catalyst cross-section is greater in the region immediately below the annular chamber than it is in the region which is immediately adjacent the inner wall of the tubular member. Also, the height of the catalyst cross-section in the region below the tubular member, as measured between the bottom edge of the tubular member that defines the inner wall of the catalyst chamber and a point on the bottom wall which is vertically aligned with the tubular member, is substantially no less, and preferably at least equal in dimension to the radius of the said tubular member.

Where space constraints are especially tight, such as when it is desired to modify an existing vessel in which the fluid inlet for the fluid to be distributed is located relatively close to the bottom of the vessel, it is possible to have the height of the catalyst cross-section beneath the tubular member somewhat less than the radius of the tubular member. In such a modification, the flow distribution of the fluid will not be as uniform across the entire catalyst bed within the tubular member, at least near the bottom of the tubular member, as in the preferred arrangement. However, the distribution can be significantly better than with distributor pipe arrangements, and will result in less attrition. Where space constraints also limit the vertical dimension of the annular chamber between the fluid inlet port and the surface of the catalyst bed which is located at the bottom of the annular chamber, it is desirable to install an annular perforated ring in the chamber. The perforated ring, when appropriately perforated, will produce a backpressure on the fluid and thereby cause the fluid to exit the annular chamber uniformly around its entire circumference, even though the fluid enters the annular chamber through a single inlet port. In order to calculate the pressure drop to be provided by the annular ring for a specific example vessel which it was desired to modify, and to determine the size of the holes to be used in the annular ring, the pressure drop was first calculated, without a ring being present, between the fluid inlet and a point 180° away on the opposite side of the vessel. The pressure drop to be provided by the annular plate was then calculated to be equal to about 10 times the previously calculated pressure drop. Finally, the flow velocity at a specific distance below the annular ring was calculated for a number of different size holes that would produce the calculated pressure drop. For example, for a particular desired pressure drop across the annular perforated plate, it was determined that the use of 0.125" diameter holes would produce a velocity of 5 fps at a distance of 10 inches below the annular plate. Similarly, holes of 0.1875" would produce a velocity of 7 fps, holes of 0.250" would produce a velocity of 10 fps, and holes of 0.375" would produce a velocity of 14 fps. The particular size of holes to be used can then be selected based upon the maximum velocity of flow which the designer desires to apply to the catalyst or other particulate matter. Preferably, the flow velocity is maintained below the velocity at which the particulate matter will start to fluidize, since fluidization produces attrition.

DETAILED DESCRIPTION OF THE DRAWINGS

Figure 1:
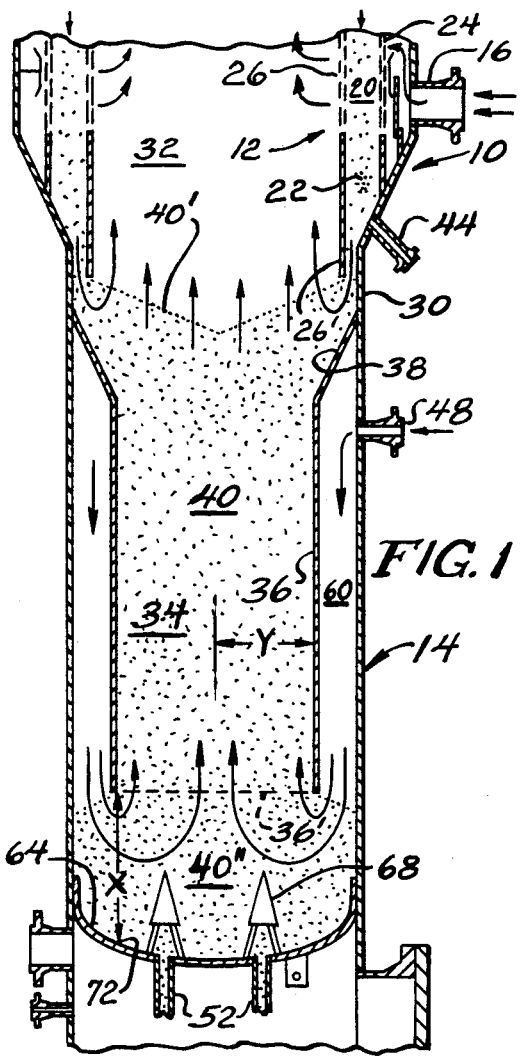
FIG. 1 is a vertical cross-section of the cylindrical drying section of a continuous catalyst regeneration tower which incorporates the invention in its preferred mode.

Referring to FIG. 1, the invention is illustrated in association with a section of a cylindrical catalyst regeneration tower indicated generally at 10, which is part of a continuous catalytic reformer. The tower section illustrated includes an upper halogenation zone indicated generally at 12 and a lower drying zone indicated generally at 14. The flow path of the vapor entering inlet port 16 in the upper zone 12 extends principally in a radial direction through the annular bed 20 of catalyst particles 22 which is descending downwardly between the perforated screen members 24, 26. However, a very small portion of the vapor from port 16 exits downwardly between the non-perforated lower end 26' of the screen 26 and the outer vessel wall 30 and then passes upwardly into the open region 32. The annular bed 20 passes downwardly into, and fills, a generally cylindrically shaped chamber 34 defined by the inner wall of a pipe member 36 whose upper end tapers outwardly as a cone-shaped portion 38 until it contacts and is welded to the outer vessel wall 30. Since the annular catalyst bed 20 gravitationally enters the chamber 34 at the upper end of cone-shaped portion 38, the upper surface of the catalyst bed 40 will assume the generally conical surface indicated at 40'. As discussed in detail in my co-pending U.S. application Ser. No. 686,053, filed Dec. 24, 1984, now U.S. Pat. No. 4,567,022, which is assigned to a common assignee and issued on Jan. 28, 1986 as U.S. Pat. No. 4,567,022, the aforedescribed structure prevents any of the vapors normally passing upwardly through bed 40 from contacting the catalyst near the bottom of bed 20. Thus, it is feasible to sample such catalyst through a sampling port such as the one shown at 44.

The present invention is principally concerned with distributing a vapor or gas which enters the drying zone 14 through a port 48 in the outer vessel wall 30 in such a manner that it can pass upwardly through the catalyst bed 40 contained in the generally cylindrical chamber 34 in a very uniform manner and without in any way obstructing the downward movement of the bed 40. The inside diameter of the pipe member 36 and the minimum vertical height of the catalyst bed 40 located above the plane containing the bottom end 36' of the pipe member 36 generally determine the volume of catalyst to be contacted by the vapor or gas entering port 48. By controlling the average volume of catalyst being removed per unit of time through the lower exit ports 52, the residence time of contact between the catalyst and the vapor or gas can be controlled. It is important that the diameter of the pipe member 36 not be too small since decreasing the diameter of chamber 34 would cause a corresponding increase in the velocity at which a predetermined volume of vapor or gas entering port 48 impinges on the catalyst particles. As is well known, too great an infringement velocity will tend to fluidize the particles of the bed and cause them to attrite. Where the vapor or gas enters the open annular chamber 60 between the pipe member 36 and the vessel wall 30 at a single location, such as port 48, it is desirable to place the port 48 at a relatively high position in the chamber 60. It should be located far enough above the lower end 36' of the pipe member 36 that the incoming vapor or gas will become sufficiently well distributed in the chamber 60 that it will exit at a relatively uniform velocity and flow rate around the entire periphery of the lower end 36' of the pipe member. A position for the port 48 which is equal to five or more radial widths of the chamber 60 appears to provide satisfactory results. It is also desirable that a point 72 on the bottom wall 64 of the vessel which is located in vertical alignment with the lower end 36' of the pipe member be spaced from end 36' by a distance "x" which is substantially no less than, and preferably equal to or greater than, the radius "y" of the pipe member 36. The distance "x" should be sufficient to allow the vast majority of the downward flow of vapors or gases exiting the annular chamber 60 to pass through the lower catalyst bed portion 40" substantially without obstruction and be distributed substantially uniformly across the entire transverse cross-section of the catalyst bed portion 40. Although dimension "x" is shown in FIG. 1 as being substantially greater than dimension "y", the principal reason for this difference is to establish plug flow of catalyst in bed 40 above lower edge 36' of chamber 34. Cone shaped covers 68 located above exit ports 52 aid in establishing the abovementioned plug flow.

Figure 2:
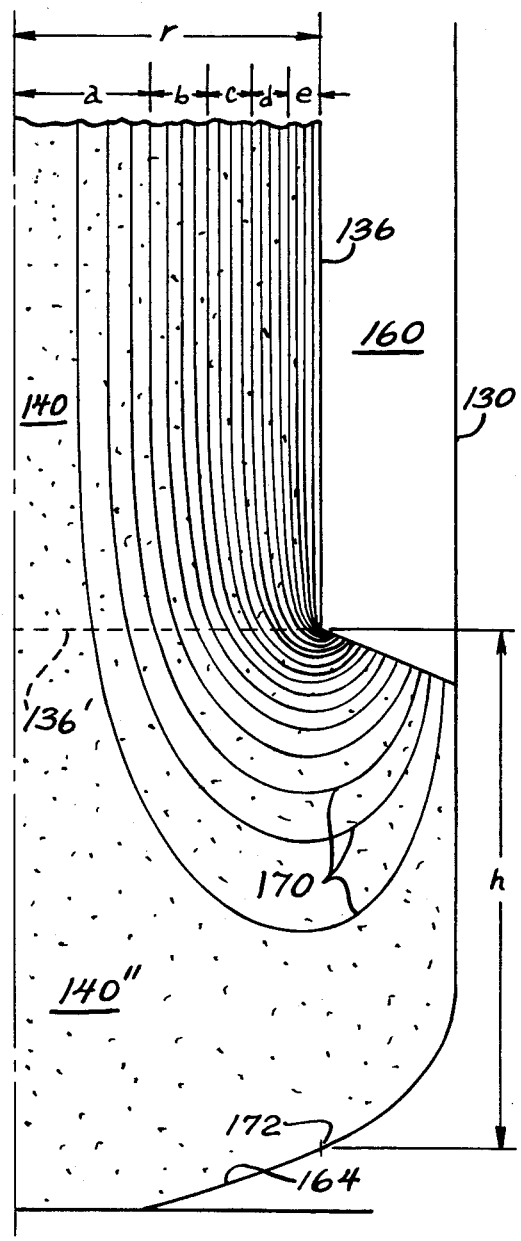
FIG. 2 is a schematic representation, based on a computer model, of the flow of vapor down into and up through one half of a cylindrical catalyst bed.

FIG. 2 is a schematic representation generated from a computer model, illustrating the flow streamlines for equal volumes of vapor entering a cylindrical particulate catalyst bed 140 from an annular chamber 160. The elements numbered 130-164 in FIG. 2 correspond to the similar elements 30-64 in FIG. 1. To illustrate the uniformity of the flow achieved, the radius "r" of the pipe member 136 or catalyst bed 140 is divided into five segments "a", "b", "c", "d", and "e" which are of a dimension such that the circular or annular areas which underlie them will all be equal in area. The nineteen streamlines 170 which are shown in FIG. 2 divide the vapor flow entering the catalyst beds 140", 140 into twenty equal volumes. Since each of the segments of "a"-"e" is seen to contain four streamlines, it is obvious that uniform contact will be achieved with all of the catalyst particles which make up bed 140. It can be further seen that the uniformity of flow is achieved quite near the bottom of the bed 140 since the streamlines 170 appear to quickly become vertical after they enter bed 140. To obtain the character of uniform distribution shown in FIG. 2, it is preferable to have the lower catalyst bed 140" deep enough that a point 172 on the bottom wall 164 of the vessel which is in vertical alignment with the pipe member 136 will be positioned below the lower edge of pipe 136 by a distance "h" which is at least equal to the radial dimension "r".

Figures 3, 4:
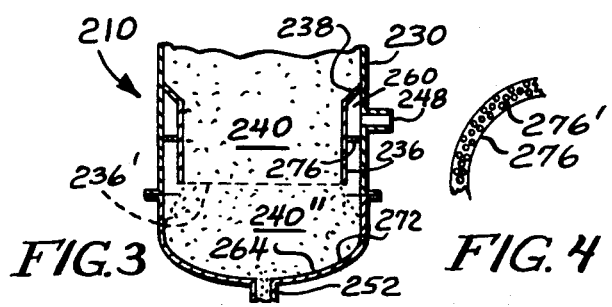
FIG. 3 is a vertical cross-section of a modification of the invention disclosed in FIG. 1 which can be utilized where vertical space is at a premium, such as in the replacement of an existing perforated pipe type of distributor apparatus.
FIG. 4 is a fragmentary top plan view of a perforated annular ring which is shown in vertical section in FIG. 3.

FIG. 3 is a vertical cross-sectional view illustrating a modification of the flow distributor invention disclosed in FIG. 1. The apparatus indicated generally at 210 represents a modification of an existing regenerator vessel 230 in which the vapor or gas inlet port 248 is located far closer to the bottom wall 264 of the vessel than is the case with the corresponding elements 48, 64 in FIG. 1. Before modification, the catalyst bed 240 would have extended to the outer walls of the vessel 230 and the vessel would have lacked the pipe member element 236 and surrounding ring 276. There would also have been a central trunk of a pipe distributor, and several branches, projecting across the interior of the vessel from port 48. To modify the existing vessel, the old pipe distributor (not shown) is removed and a pipe member 236 is installed by welding its tapered top portion 238 to the outer wall of the vessel 230. The diameter selected for the pipe member 236 is somewhat critical since it must be large enough that the quantity of gas passing upwardly through the catalyst bed 240 will have a velocity below the fluidization velocity of the catalyst bed. However, increasing the diameter of pipe 236 would obviously decrease the radial width of the annular chamber 260. Since a given volume of gas must exit downwardly from annular chamber 260 into catalyst bed portion 240", it is also necessary that the annular cross-sectional area of chamber 260 be large enough to insure that the gas will not fluidize the catalyst particles as it enters bed portion 240". In the configuration shown in FIG. 3, the single gas inlet port 248 is shown as being positioned so close to the bottom edge 236' of the pipe member 236 that one could not normally expect to achieve a uniform volume of flow around the entire circumference of the annular lower end of the chamber 260. However, by positioning an annular ring 276 having a plurality of perforations 276' (FIG. 4) intermediate the inlet port 248 and the bottom of pipe member 236, it is possible to create sufficient backpressure that the gas entering port 248 will be uniformly distributed by the time it reaches the catalyst bed 240". As previously discussed, the diameter of the perforations is selected for a given pressure drop across the annular perforated ring 276, to provide a particular velocity at a predetermined distance below the ring. A large number of small holes will obviously provide a lower maximum gas velocity at any point located in a plane at a predetermined distance below the ring than a smaller number of larger holes since the flow from the more closely positioned holes will blend together in a shorter distance.

In the embodiment shown in FIG. 3, it is apparent that the vertical distance between the lower edge 236' and a point 272 on the lower end member 264 which is immediately beneath the edge 236' is slightly less than the radius of chamber 34. Although such a situation could result in slightly less uniform flow distribution than if the said vertical distance were equal to or greater than the chamber radius, as in FIG. 1, the distribution would still be far superior to that achieved by the prior art pipe distributors.

I claim:

1. Apparatus for contacting a gas with a bed of particles wherein: (1) there is no obstruction to downward movement of particles through said bed, (2) flow of said gas through any horizontal cross-section of said bed is substantially uniform, and (3) substantially all of said gas passes through the entire vertical height of said bed, said apparatus comprising:

(a) a vertical cylindrical pipe member which contains said bed;

(b) a sidewall section of a vertical cylindrical vessel and an internal partition disposed in a generally horizontal manner within said sidewall section, where said sidewall section is larger in diameter than said pipe member, where the pipe member is coaxially disposed within said sidewall section, where the sidewall section extends below the lower end of the pipe member, and where particles leaving the lower end of said bed are contained by said sidewall section and partition such that there is no discontinuity in the mass of particles occupying the bed and the sidewall section below the pipe member;

(c) an annular chamber formed by the outer surface of said pipe member and the inner surface of said sidewall section;

(d) a partition disposed between the top of the pipe member and the sidewall section in order to prevent gas from flowing out of the top of said annular chamber; and, (e) at least one gas inlet port in said sidewall section which is spaced vertically above the lower end of the pipe member.

2. The apparatus of claim 1 further characterized in that the vertical distance between the bottom end of the pipe member and said partition is at least equal to the radius of the pipe member.

3. The apparatus of claim 1 further characterized in that the vertical distance between the bottom of the pipe member and the centerline of said gas inlet port is equal to at least five times the radial width of the annular chamber.

4. The apparatus of claim 1 further including a horizontal annular ring member having a plurality of perforations, which ring member is sealingly disposed in the annular chamber between the gas inlet port and the bottom of the pipe member such that gas flowing downward in the annular chamber must pass through said perforations, where said perforations are sized and distributed around the circumference of said ring member such that the downward flow of gas in the annular chamber below the ring member through any horizontal cross section is substantially uniform.

5. The apparatus of claim 1 further characterized in that said particles are particles of catalyst and said bed comprises a drying zone of a catalyst regeneration section of a continuous catalytic reforming unit.

* * * * *